UNITED STATES PATENT OFFICE.

JULIUS SCHÄFER, OF BONN, GERMANY.

PROCESS OF MAKING ODORLESS FISH-POWDER.

SPECIFICATION forming part of Letters Patent No. 678,283, dated July 9, 1901.

Application filed June 11, 1900. Serial No. 19,878. (No specimens.)

*To all whom it may concern:*

Be it known that I, JULIUS SCHÄFER, chemist, a subject of the King of Prussia, Emperor of Germany, residing at Bonn-on-the-Rhine, Germany, have invented new and useful Improvements in Processes of Making Odorless and Tasteless Fish-Powder, of which the following is a specification.

This invention relates to a process of manufacturing odorless and tasteless fish-powder which may be used in many foods, the object of the invention being to produce fish-powder in pure condition to render the food prepared therewith more nutritive.

The process is carried out in the following manner: Fresh fish of any kind are cleaned, drawn, and freed from the scales and washed. Without any addition they are then moistened in a receptacle having a loose cover and which for the purpose is put into a steam-pot. The said cover extends over the upper edge of the receptacle, so that any condensed water is prevented from entering the interior of the receptacle containing the fish. The moistening, which is effected by the watery portion of the fish, is completed within about half an hour by using steam having a pressure of about eighteen pounds per square inch. The fish are next cooled, then disintegrated, and afterward dried by using steam at a temperature of about 312° Fahrenheit. During the first part of this drying operation—say for one hour—a stream of what is known as "holzin" vapors is conducted into the mass in order to destroy any bacteria. The mass thus dried is ground and mixed with alcohol of 96°, to which has been added citric acid in solid state—say one-half a pound citric acid to one gallon of alcohol. Instead of citric acid an equal quantity of hydrochloric acid of 24° Baumé may be employed. The quantity of this mixture must be such that the disintegrated fish mass is properly covered therewith. With the said alcoholic mixture the fish mass is boiled in order to free it from all fat, glue, and mineral substances. The heating should not be done on an open fire, but in a vessel immersed in boiling water, and should be continued for fifteen minutes after the liquid has reached boiling temperature. After the whole has been allowed to stand for a certain time the liquid is poured off and the fish mass boiled with fresh alcoholic mixture three times. Next the whole is filtered and the residue washed out with alcohol of 60° until the alcohol running down from the residue shows an acid reaction. The residue remaining on the filter apparatus after it has been perfectly dried and finally ground is ready for use in several foods—for example, in pastry—which by the addition of this fish-powder is rendered easily digestible without its taste or its proper appearance being affected. To facilitate the removal of the fat, glue, and mineral substances, there may be added to the fish mass a dilute solution of soda. By this addition the fat is saponified, and the operation of washing out the material is rendered more easy.

Having described my invention, what I claim is—

The herein-described process of making odorless and tasteless fish-powder, consisting in steaming fresh fish in their own moisture, then cooling and drying the mass and during the drying operation subjecting the mass to holzin vapors to destroy bacteria, then freeing the mass thus prepared, from fat, glue and mineral matter by treating it with alcohol containing acid, and finally boiling, drying and grinding the mass.

In witness whereof I have hereunto set my hand in presence of two witnesses.

JULIUS SCHÄFER.

In presence of—
KARL SCHMITT,
F. E. MALLETT.